(12) United States Patent
Tan

(10) Patent No.: US 8,143,829 B2
(45) Date of Patent: Mar. 27, 2012

(54) ADAPTIVE SYNCHRONOUS RECTIFICATION OF BRUSHLESS DC MOTOR BACK-EMF

(75) Inventor: Pauy-Guan Tan, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 457 days.

(21) Appl. No.: 12/395,434

(22) Filed: Feb. 27, 2009

(65) Prior Publication Data

US 2010/0002331 A1   Jan. 7, 2010

(30) Foreign Application Priority Data

Feb. 28, 2008   (SG) ................. 200801720-4

(51) Int. Cl.
*H02P 1/04*   (2006.01)

(52) U.S. Cl. .............. 318/400.09; 318/280; 318/563
(58) Field of Classification Search .......... 318/400.09, 318/280, 563, 561, 634, 560, 439, 700; 360/75, 360/69
See application file for complete search history.

(56) References Cited

U.S. PATENT DOCUMENTS

2002/0141102 A1* 10/2002 Kusumoto ............... 360/75
* cited by examiner

*Primary Examiner* — Karen Masih
(74) *Attorney, Agent, or Firm* — Graybeal Jackson LLP

(57) ABSTRACT

An embodiment of a disk drive power system is described. The system is operable such that during power interruption, the system taps electric power by rectifying the back-EMF generated across each winding of a DC motor and supplying power to a voice-coil motor to park a read/write head safely away from an associated magnetic disk surface.

37 Claims, 4 Drawing Sheets

ADAPTIVE SYNCHRONOUS RECTIFICATION OF BRUSHLESS DC MOTOR BACK-EMF

PRIORITY CLAIM

The present application claims the benefit of Singapore Patent Application Serial No. 200801720-4, filed Feb. 28, 2008, which application is incorporated herein by reference in its entirety.

TECHNICAL FIELD

An embodiment relates to a system for rectifying the back-EMF voltages of a DC motor in a magnetic disk drive during power interruption to safely park and unload a read/write head. In particular, an embodiment relates to a system for adaptive rectification of a brushless DC motor back-EMF voltages.

BACKGROUND

FIG. 1 shows a typical magnetic disk drive 10. As shown in FIG. 1, the disk drive 10 includes a disk stack of one or more magnetic disks 12 rotatable about a spindle 14. The spindle 14 is driven by a spindle motor 16, for example, a DC brushless motor. Data is written onto a magnetic disk by one or more associated read/write head(s) 18, and data is read back using the same read/write head(s) 18. The read/write head(s) 18 is/are attached to a suspension arm 20. The suspension arm 20 forms part of an actuator 22. The actuator 22 is pivotable about a pivot 24 and is driven by a voice coil motor (VCM) 26 disposed on an arm opposite the suspension arm 20. As can be seen from FIG. 1, the VCM 26 actuates the actuator 22 such that a read/write head 18 moves across a surface of an associated magnetic disk 12 in a substantially radial manner. Near the outer edge of the disk stack is a load/unload ramp 30. At a free end of each suspension arm 20 is a tab 28 extending beyond the read/write head(s) 18. The tab 28 is operable to engage with the load/unload ramp 30 during parking of the actuator 22.

In normal use, power is supplied from the mains to the disk drive 10, and the position and velocity of both the actuator 22 and read/write head(s) 18 are determinable from the servo information stored on the associated magnetic disk 12 surface. During a proper shut down operation, power is still available for a disk drive controller to move the actuator 22 back to its parking position. In the parked position, each tab 28 at the end of the suspension arm 20 is made to ride up an inclined surface of the associated load/unload ramp 30 such that the read/write head 18 is lifted up from the surface of the associated magnetic disk 12; this operation is called "unloading" of the read/write head(s) 18. When the disk drive 10 is powered up after a shut-down operation, the actuator 22 is moved from the parked position and the read/write head 18 is "loaded" onto the associated magnetic disk 12 surface. Unloading of the read/write head(s) 18 would reduce wear and tear on both a slider carrying each read/write head 18 and the associated magnetic disk surface.

During normal operation, the relative speed between a read/write head 18 and the associated disk surface creates an air cushion to lift the read/write head 18 a small height from the disk surface. Thus, each read/write head 18 relatively "flies" above the associated disk surface. In the event of a power interruption, the relative speed between the read/write head and the disk surface may not be sufficient to create an air cushion to fly the read/write head above the disk surface. Immediately after such a power interruption, the spindle motor 16 continues to rotate due to the momentum stored in the rotating magnetic disk(s) 12. During this transient period, the spindle motor 16 acts as a generator and sinusoidal back electro-motive force (BEMF) is generated across each winding in the spindle motor 16. Therefore, it is desirable to tap the motor BEMF voltages for parking the actuator 22 and unload the read/write head(s) 18 whilst the magnetic disk(s) 12 is/are still spinning.

Attempts have been made to tap the power from the BEMF to bring the actuator to its parking position during this transient period. FIG. 2 illustrates a typical disk driver system 50. As shown in FIG. 2, the system 50 includes a 3-phase DC spindle motor 16, a commutation circuit 60 consisting of six power transistors UA, UB, UC, LA, LB, LC; a bridge rectifier 80 consisting of six Schottky diodes; and a VCM 26. Not shown in FIG. 2 is a motor driver 70. During normal operation, the motor driver 70 controls the commutation circuit 60 to regulate the spindle motor 16 in one direction by turning ON the relevant power transistor UA, UB . . . LB, LC coupled to windings A, B and C in a cyclical manner. After a power interruption, the momentum in the rotating disks 12 causes the spindle motor 16 to generate sinusoidal BEMF voltages across each winding A, B, C. The BEMF voltages are passively rectified to supply power to the VCM 26 for parking the actuator 22. Capacitor 90 is used to store any excess power, which may be required by the VCM 26 to complete parking of the actuator 22.

Attempts have been made to tap the power from the motor BEMF. One approach given is a driver system 100 shown in FIG. 3. As shown in FIG. 3, the system 100 includes a 3-phase motor 116, a motor driver 110 consisting of a H-bridge of 6 power transistors UA, UB, UC, LA, LB, LC; a commutator circuit 114, a decoder and latch circuit 118, a VCM 126; a FET isolation circuit 120 and a VCM control circuit 124. The commutator circuit 114 consists of three comparators CPA, CPB, CPC. Each of the comparator CPA, CPB, CPC is coupled across the respective motor winding A, B, C. After power interruption, the mains supply Vcc is uncoupled by the isolation circuit 120 and the output of the commutator circuit 114 is decoded and latched by the circuit 118 such that the relevant power transistor UA, UB LB, LC is sequentially turned ON to allow the BEMF across each winding A, B, C to pass through to power the VCM 126. The VCM control circuit 124 drives the VCM 126 in one direction or another in accordance with the desired direction of the read/write head 18.

BRIEF DESCRIPTION OF THE DRAWINGS

Despite development in the prior art, it can be seen that there exists a need for a system to adaptively tap the motor BEMF to park the actuator 22 during a power interruption.

One or more non-limiting embodiments are discussed with reference to the accompanying drawings, in which.

DETAILED DESCRIPTION

Figure 1:
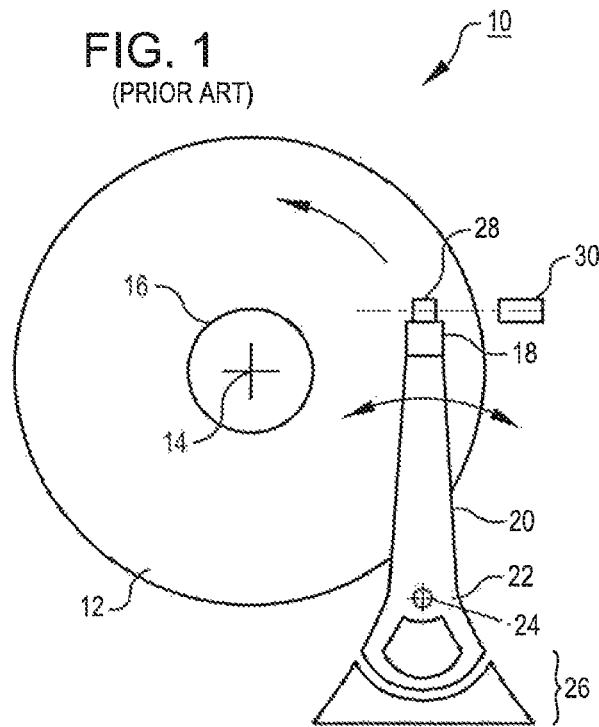
FIG. 1 illustrates a conventional magnetic disk drive system.
Figure 2:
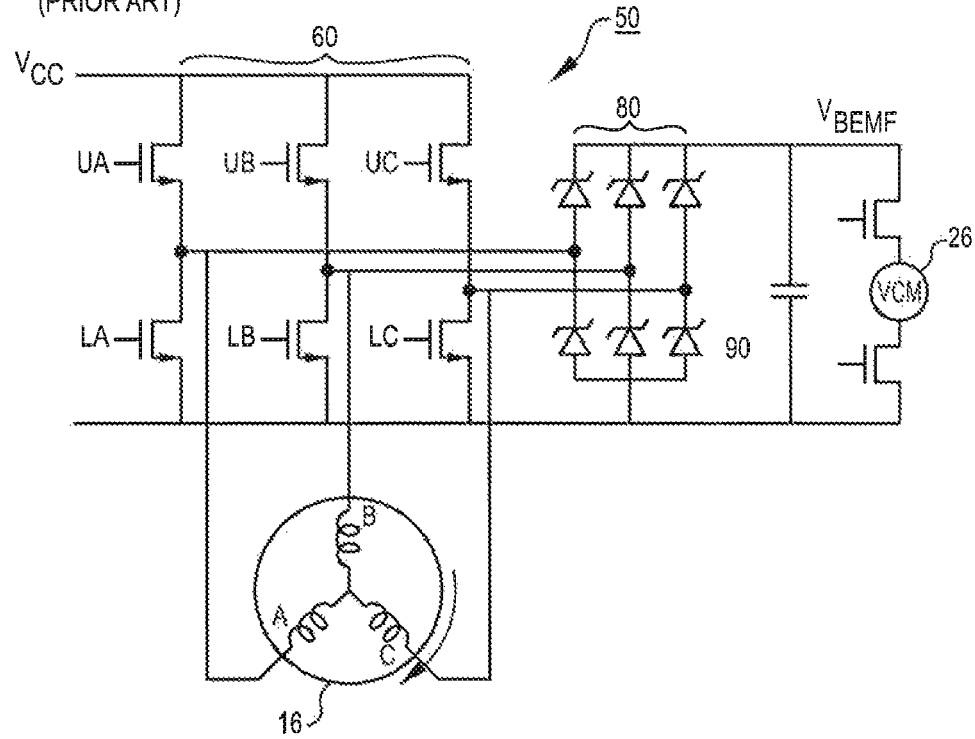
FIG. 2 illustrates a conventional motor BEMF rectification system.
Figure 3:
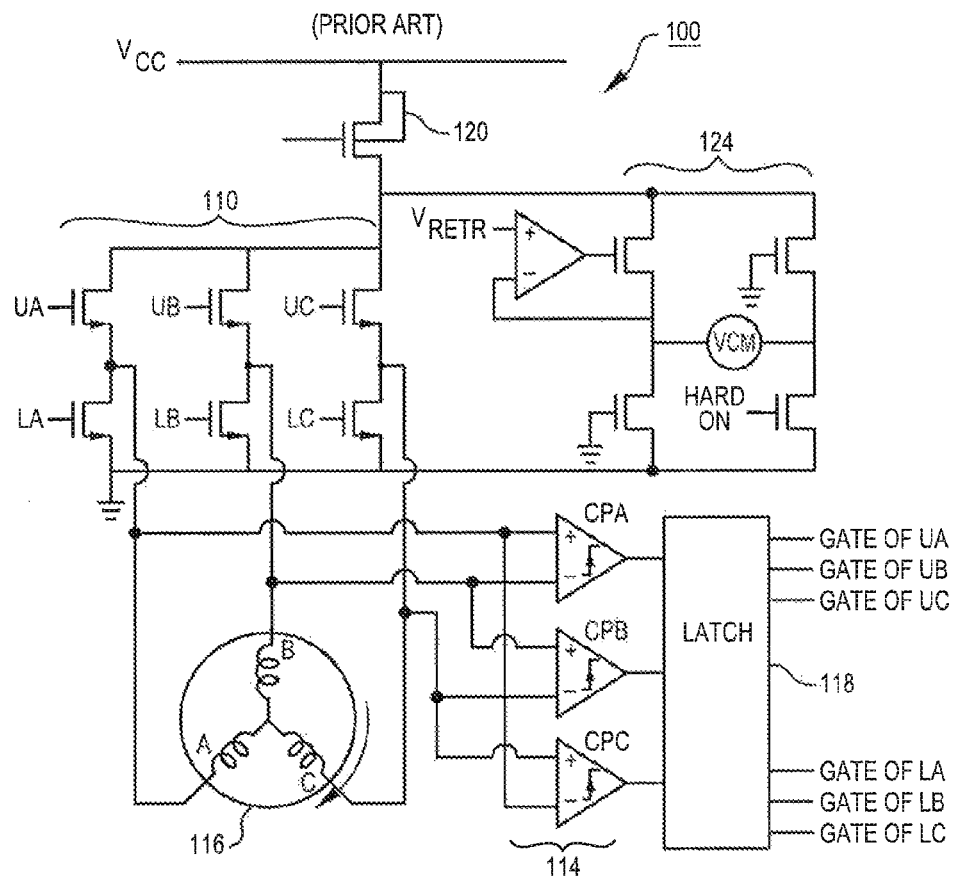
FIG. 3 illustrates another conventional motor BEMF rectification system.

One or more specific and alternative embodiments will now be described with reference to the attached drawings. It shall be apparent to one skilled in the art, however, that the disclosed subject matter may be practiced without such specific details. Some of the details may not be described at length so as not to obscure the description. For ease of reference, common reference numerals or series of numerals will be used throughout the figures when referring to the same or similar features common to the figures.

One embodiment provides a system for a disk drive during power interruption. The system comprises: a plurality of power transistor arranged in a H-bridge with respect to each winding in the DC motor on an upper motor control circuit; an equal plurality of power transistors arranged in a H-bridge with respect to each winding in the DC motor on a lower motor control circuit; and a comparator operable to couple across each of the plurality of power transistors; wherein, during power interruption, a back-EMF voltage in a first motor winding is operable to increase and cross a decreasing back-EMF in second motor winding at a voltage-crossing on the upper motor control circuit, and the comparator associated with the first motor winding is operable to turn ON when the comparator input is above the supply rail voltage, thereby turning ON the transistor associated with the comparator and allowing the voltage above the voltage-crossing to pass through the transistor and, at the same time, turning OFF the comparator associated with the third motor winding; wherein the back-EMF voltage in a first motor winding is operable to decrease and cross an increasing back-EMF voltage in a third motor winding at a voltage-crossing on the lower motor control circuit, and the comparator associated with the second winding is operable to turn ON when the comparator input is below the ground rail voltage, thereby turning ON the transistor associated with the comparator and allowing the voltage below the voltage-crossing to pass through the transistor and, at the same time, turning OFF the transistor associated with the second motor winding; and the disk drive system is operable to repeat the turning ON and OFF of the comparators in a cyclical manner according to the sequence of commutating of the DC motor.

In another embodiment, the comparator associated with the upper motor circuit in each winding is supply-rail compliant while the comparator associated with the lower motor control circuit in each winding is ground-rail compliant.

In another embodiment, the disk drive system comprises a full-wave rectifier, a state machine, and a filter clamping circuit. In one embodiment of the state machine, the state machine comprises a plurality of circuits, with each circuit comprising a D flip-flop and a pre-driver. In another embodiment, the filter clamping circuit is operable to provide a 2 μs pulse for clamping the trigger of the each comparator to the output of the respective D flip-flop.

In another embodiment of the disk drive system, the DC motor comprises 3-phase windings.

Figure 4:
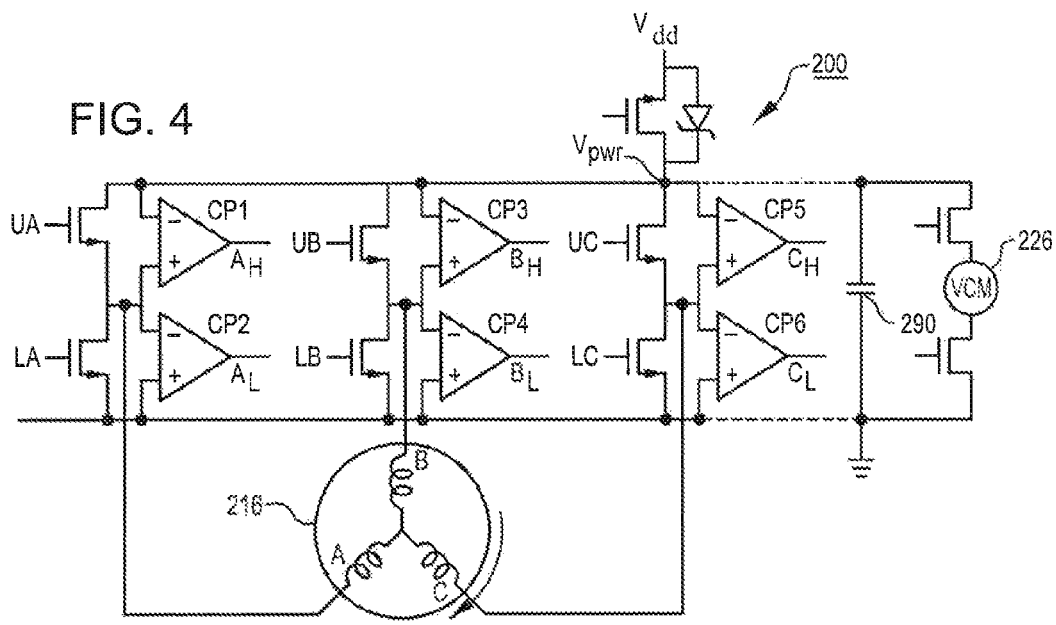
FIG. 4 illustrates a motor BEMF rectification system according to an embodiment.

FIG. 4 shows a motor BEMF power system 200 according to an embodiment. A rectified BEMF voltage Vpwr is produced at a supply rail. As shown in FIG. 4, the BEMF power system 200 includes a 3-phase brushless DC motor 216; three upper transistors UA, UB, UC and three lower transistors LA, LB, LC for commutating three windings A, B, C of the DC motor 216; six comparators CP1, CP2 ... CP6, each coupled across an associated transistor UA, UB, ... LB, LC. The drains of the upper transistors UA, UB, UC are coupled to the supply rail at the rectified BEMF voltage Vpwr, while the sources of the lower transistors LA, LB, LC are coupled to a ground rail. In addition, FIG. 4 also shows the supply and ground rails coupled to a VCM 226 with a capacitor 290 coupled across the VCM 226. In one embodiment, the transistors UA, UB ... LB, LC are lateral doped metal-oxide semiconductor (LDMOS) transistors. As shown in FIG. 4, the BEMF power system 200 is isolated from the mains supply Vdd by a reversed diode.

The voltage comparators CP1, CP3, CP5 coupled across the upper transistors UA, UB, UC, respectively, are supply-rail compliant type, i.e., the input of each comparator can be higher than the supply voltage. The voltage comparators CP2, CP4, CP6 coupled across the lower transistors LA, LB, LC, respectively, are ground-rail compliant, i.e., the input of each comparator can be lower than the ground voltage.

Figure 5:
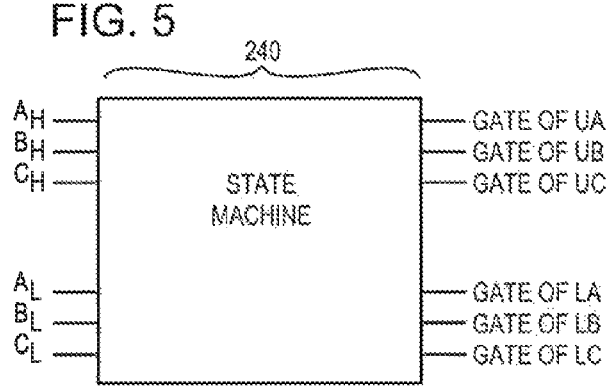
FIG. 5 illustrates an embodiment of a state machine for use with the system shown in FIG. 4.

FIG. 5 shows a state machine 240. The state machine 240 defines the sequential logic for turning ON and OFF of the relevant transistors UA, UB ... LB, LC to produce the rectified BEMF supply voltage Vpwr. As shown in FIG. 5, the output $A_H$ of comparator CP1 is input to the gate of transistor UA, the output $B_H$ of comparator CP3 is input to the gate of transistor UB, and the output $C_H$ of comparator CP5 is input to the gate of transistor UC. The inverting inputs of the comparators CP1, CP3, CP5 are coupled to the BEMF supply voltage rail (Vpwr), and H denotes the high side of the rectification control circuit. Also as shown in FIG. 5, the output $A_L$ of comparator CP2 is output to the gate of transistor LA, the output $B_L$ of comparator CP4 is output to the gate of transistor LB, and the output $C_L$ of comparator CP6 is output to the gate of transistor LC. The non-inverting inputs of the comparators CP2, CP4, CP6 are coupled to the ground rail, and L denotes the low side of the rectification control circuit. During periods of normal operation, the state machine 240 may be disabled from generator active signal levels for any of the gate signals.

Figure 6:
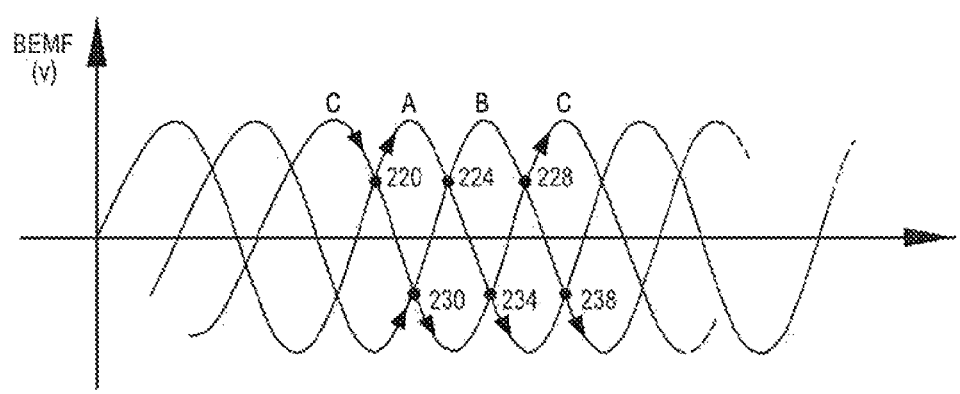
FIG. 6 illustrates the BEMF voltages generated by the various phases of the motor windings of the system shown in FIG. 5.

FIG. 6 shows sinusoidal BEMF voltages $V_A$, $V_B$, $V_C$ generated across each winding A, B, C of the DC motor 216. These BEMF voltages $V_A$, $V_B$, $V_C$ are idealized for ease of illustration only. Referring to the positive side of the BEMF voltages in FIG. 6, when phase A voltage $V_A$ is increasing whilst phase C voltage $V_C$ is decreasing, they cross at point 220. Once the phase A voltage $V_A$ is at a threshold voltage above the supply rail voltage Vpwr, the comparator CP1 is turned ON and the output $A_H$ of CP1 changes from state 0 to state 1. The state machine 240, in turn, turns ON the gate of transistor UA and turns OFF the transistor UC. By turning ON the gate of the transistor UA, the phase A BEMF voltage $V_A$ is coupled to the supply rail as a phase A component voltage.

When $V_A$ is decreasing and phase B voltage $V_B$ is increasing, they cross at point 224. Once the phase B voltage $V_B$ is at a threshold voltage above the supply rail voltage Vpwr, the comparator CP3 is turned ON and the output $B_H$ of CP3 changes from state 0 to state 1. In response, the state machine 240 turns ON the gate of the transistor UB and turns OFF the transistor UA. By turning ON the gate of the transistor UB, the phase B BEMF voltage $V_B$ is coupled to the supply rail as a phase B component voltage.

Similarly, when phase C voltage $V_C$ is increasing while $V_B$ is decreasing, they cross at point 228 and the comparator CP5 is turned ON and the output $C_H$ of CP5 changes from state 0 to state 1. In response, the state machine 240 turns ON the gate of the transistor UC and turns OFF the transistor UB. By turning ON the gate of transistor UC, the phase C BEMF voltage V is supplied to the supply rail as a phase C component voltage.

On the negative side of the BEMF voltages, as seen in FIG. 6, a similar sequence of switching of the relevant transistors LA, LB, LC also takes place. As shown in FIG. 6, as $V_C$ is decreasing and $V_B$ is increasing and they cross at point 230. Once $V_C$ is at a threshold voltage below ground, the comparator CP6 is turned ON and the output $C_L$ of CP6 changes from state 0 to state 1. In response, the state machine 240 turns ON the gate of transistor LC and turns OFF the transistor LB. With the gate of transistor LC being turned ON, the phase C voltage $V_C$ is supplied to the ground rail.

When $V_A$ is decreasing and $V_C$ is increasing, they cross at point 234. Once $V_A$ is at a threshold voltage below ground, the comparator CP2 is turned ON and the output $A_L$ of comparator CP2 changes from state 0 to state/and, in response, the state machine 240 turns ON the gate of transistor LA and turns OFF the transistor LC. With the gate of transistor LA being turned ON, the phase A voltage $V_A$ is supplied to the ground rail.

Similarly, when $V_B$ is decreasing and $V_A$ is increasing, they cross at point 238. Once $V_B$ is at a threshold voltage below ground, the comparator CP4 is turned ON and the output $B_L$ of CP4 changes from state 0 to state 1 and, in response, the state machine turns ON the gate of transistor LB and turns OFF the transistor LA. With the gate of transistor LB being turned ON, the phase B voltage $V_B$ is supplied to the ground rail.

Figure 7:
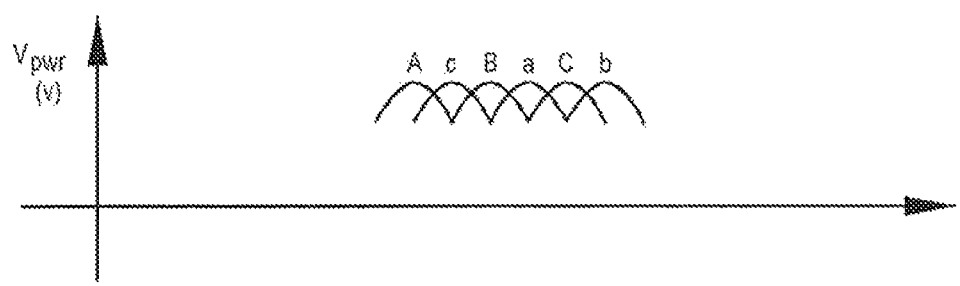
FIG. 7 illustrates components of the rectified BEMF voltage of FIG. 6.

By combining the sequences of turning ON and OFF of the transistors UA, UB . . . LB, LC on a time scale and passing the components of the phase A, B and C voltages through the full-wave rectifier, FIG. 7 shows components of a full-wave rectification of the BEMF voltage Vpwr. The components of the BEMF voltage Vpwr is a cyclic sequence of the three-phase voltages that are greater in magnitude than the BEMF crossing voltage. As can be seen from FIG. 6, the components of the BEMF voltage Vpwr are cyclically: Ac, cB, Ba, aC, Cb and bA where A, B, C denote the high side voltage components and a, b, c denote the low side voltage components.

In one BEMF power system 200 according to an embodiment, full-wave rectification of the BEMF voltage Vpwr is adaptive to the crossing voltage between two BEMF voltages across the relevant windings in the DC motor 216, i.e., the BEMF voltages above the crossing voltage are rectified and supplied to the supply rail irrespective of time. In other words, as the DC motor 216 slows down, the BEMF voltages progressively decrease and the BEMF voltage traces become stretched out, the BEMF power system 200 produces a full-wave rectification of the BEMF voltage Vpwr as long as the BEMF voltages are higher in magnitude than Vpwr. As can be seen, the BEMF power system 200 does not require any timing information, i.e., does not rely on timing of the relevant crossing voltages. The BEMF voltages in this embodiment are full-wave rectified and are supplied to the VCM for parking the read/write head(s) safely away from the associated disk surface(s), besides powering the comparator circuit, state machine circuit, and so on.

Figure 8:
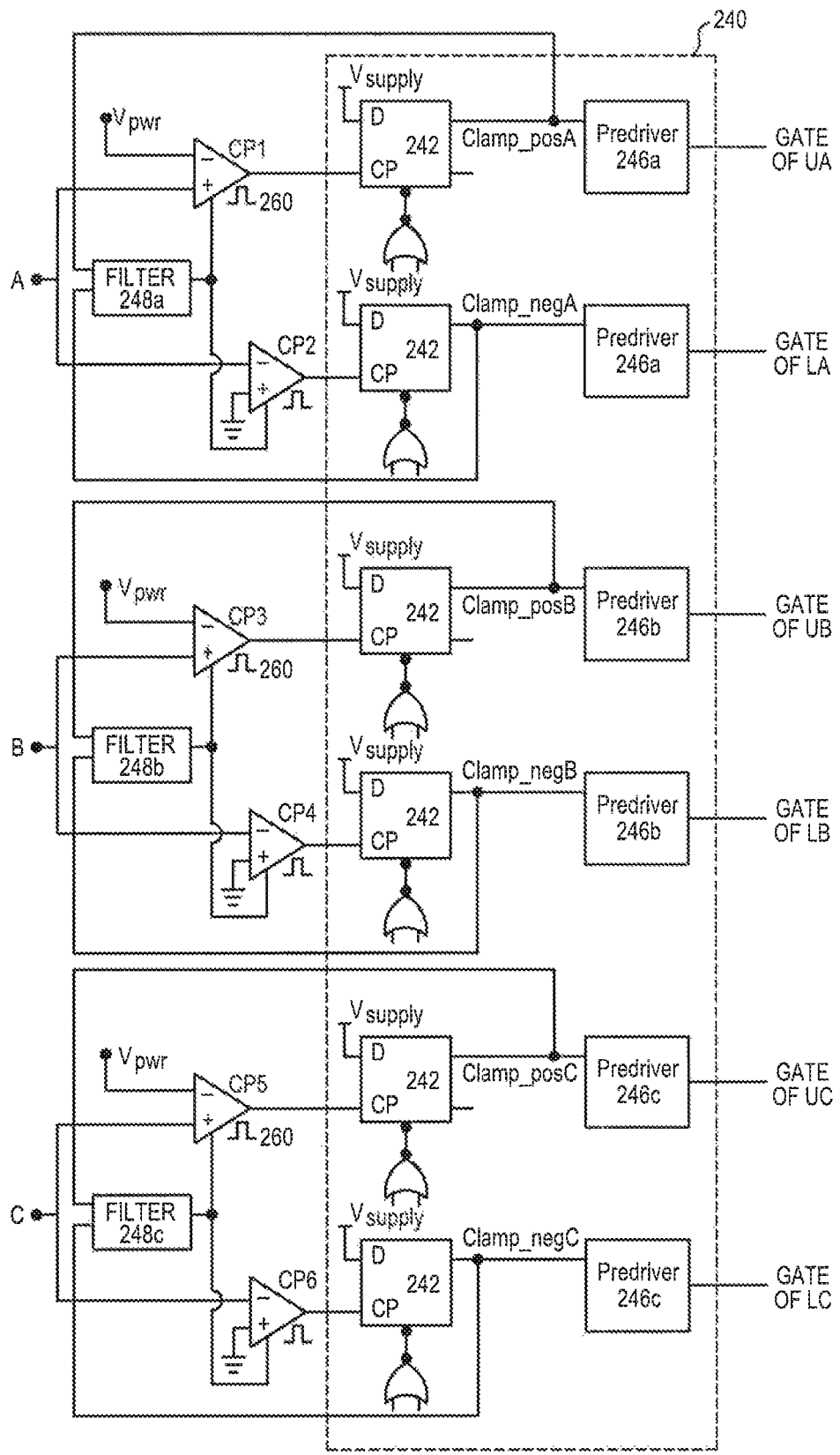
FIG. 8 illustrates a schematic of the state machine shown in FIG. 5.

In one embodiment, the state machine 240 uses logic gates and flip flops. FIG. 8 shows a schematic of the state machine 240 coupled to the outputs of the comparators CP1, CP2 . . . CP6. As shown in FIG. 8, the state machine 240 is made up of six circuits. An input of each circuit is coupled to each output of the comparators CP1 . . . CP6. Each circuit has a flip flop 242, whose output is coupled to a pre-driver 246*a*, 246*b*, 246*c*, where a, b, c refers to the phases. The output of each pre-driver 246*a*, 246*b*, 246*c* produces signals to drive the gates of the relevant upper and lower transistors UA, UB, . . . LB, LC. Within each pre-driver 246*a*, 246*b*, 246*c* is a logic circuit (not shown) to produce the required outputs to turn ON and OFF the relevant transistors UA, UB . . . LB, LC. In addition, a filter circuit 248*a*, 248*b*, 248*c* provides a masking signal 260 to the pair of comparators coupled to each motor phase windings A, B, C for masking off electrical noises. As shown in FIG. 8, the output of flip-flop 242 associated with the positive BEMF voltage is "clamped" to the input of the filter circuit 248*a* so as not to trigger the circuits on the negative BEMF side. Similarly, the output of the flip-flop 242 associated with the negative BEMF voltage is "clamped" to the input of the filter circuit 248*a* so as not to trigger the circuits on the positive BEMF side. In this way, the filter circuit 248*a*, 248*b*, 248*c* ensures that the state machine 240 does not mis-trigger. In one embodiment, the masking signal 260 is a 2 micro-second pulse. $V_{supply}$ (which may be the same as $V_{dd}$ in FIG. 4) may disable the state machine 240 during normal operation when $V_{supply}$ is not interrupted, or, $V_{supply}$ may be separate from $V_{dd}$.

In one embodiment, the power system 200, the state machine 240 and associated controls are implemented on a single chip or chip-set disposed on a circuit board on each disk drive. The chip or chipset, disk drive motor and circuit board may be sold separately, partially assembled or fully assembled. Furthermore, the system 200 may include a computer that includes the disk drive.

While specific embodiments have been described and illustrated, it is understood that many changes, modifications, variations and combinations thereof could be made without departing from the scope of the disclosure. For example, while a 3-phase DC brushless motor is used in the description, the principle is applicable to a motor with four or more phases.

Naturally, in order to satisfy local and specific requirements, a person skilled in the art may apply to the solution described above many modifications and alterations. Particularly, although one or more embodiments have been described with a certain degree of particularity, it should be understood that various omissions, substitutions and changes in the form and details as well as other embodiments are possible. Moreover, it is expressly intended that specific elements and/or method steps described in connection with any disclosed embodiment may be incorporated in any other embodiment as a general matter of design choice.

The invention claimed is:

1. A disk drive system including one or more magnetic disks arranged in a stack and rotatable on a spindle, a read/head movable relative to a surface of an associated magnetic disk, a DC motor for rotating the spindle and a voice-coil motor for actuating the read/write head, said system comprising:

a plurality of power transistors arranged in respective H-bridges with respect to each winding in the DC motor on an upper motor control circuit;

an equal plurality of power transistors arranged in the respective H-bridges with respect to each winding in the DC motor on a lower motor control circuit; and a comparator operable to couple across each of the plurality of power transistors;

wherein the disk drive system is operable such that, during power interruption, a back-EMF voltage in a first motor winding is increasing and crosses a decreasing back-EMF in second motor winding at a voltage-crossing on the upper motor control circuit, and the comparator associated with the first motor winding is turned ON when the comparator input is above the supply rail voltage, thereby turning ON the transistor associated with the comparator and allowing the voltage above the voltage-crossing to pass through the transistor and, at the same time, turning OFF the transistor associated with the third motor winding;

wherein the disk drive system is operable such that the back-EMF voltage in a first motor winding is decreasing and crosses an increasing back-EMF voltage in a third motor winding at a voltage-crossing on the lower motor control circuit, and the comparator associated with the second winding is turned ON when the comparator input is below the ground rail voltage, thereby turning ON the transistor associated with the comparator and, at the same time, turning OFF the transistor associated with the second motor winding; and wherein the disk drive system is operable to repeat the turning ON and OFF of the transistors in a cyclical manner in accordance with a sequence of commutating of the DC motor.

2. A disk drive system according to claim 1, wherein the comparator associated with the upper motor control circuit in each motor winding is supply-rail compliant while the comparator associated with the lower motor control circuit in the same winding is ground-rail compliant.

3. A disk drive system according to claim 1, further comprising a full-wave rectifier.

4. A disk drive system according to claim 3, wherein the disk drive system is further operable such that the back-EMF voltages coupled by the power transistors are full-wave rectified to form the output back-EMF voltage.

5. A disk drive system according to claim 1, wherein the disk drive system is further operable such that the switching ON and OFF of the relevant transistors is carried out by a state machine.

6. A disk drive system according to claim 5, wherein the state machine comprises two circuits associated with each motor winding, one circuit is associated with the upper motor control circuit while the second is associated with the lower motor control circuit.

7. A disk drive system according to claim 6, wherein each of the state machine circuits comprises a respective D flip-flop whose output is coupled to a pre-driver.

8. A disk drive system according to claim 7, wherein the state machine further comprises a filter circuit operable to clamp the triggering of the comparators associated with each motor winding to the respective output of the D flip-flop.

9. A disk drive system according to claim 8, wherein the filter circuit is operable to provide a clamp voltage of a substantially 2 microsecond pulse.

10. A disk drive system according to claim 1, wherein the DC brushless motor comprises 3-phase windings.

11. A disk drive system according to claim 10, wherein the component voltage phases are segments of the winding voltages in a cyclic manner: Ac, cB, Ba, aC and Cb, where A, B and C are positive sinusoidal back-EMF voltages while a, b and c are negative sinusoidal back-EMF voltages.

12. A back electromotive force BEMF power system for a memory disk drive, said drive comprising a DC motor having a plurality of windings, with the DC motor being operable to rotate a magnetic disk, and a voice coil motor (VCM), said system comprising:

a plurality of power transistors operable to be arranged in respective H-bridges with respect to each winding in the DC motor on an upper motor control circuit such that the drain of each power transistor is coupleable to a BEMF supply rail, and an equal plurality of power transistors operable to be arranged in the respective H-bridges with respect to each winding in the DC motor on a lower motor control circuit such that the source of each power transistor is coupleable to a ground rail;

a supply rail compliant comparator operable to couple across each of the plurality of power transistors associated with the upper motor control circuit, and a ground rail compliant comparator operable to couple across each of the plurality of power transistors associated with the lower motor control circuit; and a state machine operable to cyclically turn on and off the relevant power transistors in response to cyclic triggering of each comparator.

13. A BEMF power system according to claim 12, further comprising a full-wave rectifier.

14. A BEMF power system according to claim 12, wherein the state machine comprises two circuits associated with each motor winding, one circuit is associated with the upper motor control circuit while the second is associated with the lower motor control circuit.

15. A BEMF power system according to claim 14, wherein each of the state machine circuit comprises a D flip-flop whose output is coupled to a pre-driver.

16. A BEMF power system according to claim 15, wherein the state machine further comprises a filter circuit operable to clamp the triggering of the comparators associated with each motor winding to the respective output of the D flip-flop.

17. A BEMF power system according to claim 16, wherein the filter circuit is operable to provide a clamp voltage of a substantially 2 microsecond pulse.

18. A kit of parts for a memory disk drive back electromotive force BEMF, power system, said kit comprising:

a plurality of power transistors operable to be arranged in respective H-bridges with respect to an upper motor control circuit associated with each winding of a DC motor such that the drain of each power transistor is coupleable to a BEMF supply rail, and an equal plurality of power transistors operable to be arranged in the respective H-bridges with respect to a lower motor control circuit associated with each winding in the DC motor such that the source of each power transistor is coupleable to a ground rail;

a supply rail compliant comparator operable to be coupled across each of the plurality of power transistors associated with the upper motor control circuit, and a ground rail compliant comparator operable to be coupled across each of the plurality of power transistors associated with the lower motor control circuit; and a state machine operable to cyclically turn on and off the relevant power transistors in response to cyclic triggering of each comparator.

19. A motor controller, comprising:

a first supply node operable to receive a first supply voltage during a first period and to be isolated from the supply voltage during a second period; and a rectifier operable, while the supply node is isolated from the supply voltage, to cause a first motor coil to be coupled to the supply node in response to the first coil generating a first voltage having a same polarity as a voltage on the supply node and having a magnitude greater than a magnitude of the voltage on the supply node, to cause a second motor coil to be coupled to the supply node in response to the second coil generating a second voltage having the same polarity as the voltage on the supply node and having a magnitude greater than the magnitude of the voltage on the supply node, and to cause the first coil to be uncoupled from the supply node in response to coupling the second coil to the supply node.

20. The motor controller of claim 19, further comprising:
   a motor driver including
      a first switch having a control node, a first conduction node coupled to the supply node, and a second conduction node operable to be coupled to the first coil, and
      a second switch having a control node, a first conduction node coupled to the supply node, and a second conduction node operable to be coupled to the second coil; and
   wherein the rectifier includes
      a first comparator having first and second input nodes coupled across the first switch and having an output node coupled to the control node of the first switch; and
      a second comparator having first and second input nodes coupled across the second switch and having an output node coupled to the control node of the second switch.

21. The motor controller of claim 19, further comprising a coupler operable to couple the supply node to the supply voltage during the first period and to isolate the supply node from the supply voltage during the second period.

22. The motor controller of claim 19, further comprising a driver circuit coupled to the supply node and operable to drive a voice coil motor while the first supply node is isolated from the supply voltage.

23. The motor controller of claim 19, further comprising:
   a second supply node; and
   wherein the rectifier is further operable while the first supply node is isolated from the supply voltage
      to cause the first motor coil to be coupled to the second supply node in response to the first coil generating a first voltage having a same polarity as a voltage on the second supply node and having a magnitude greater than a magnitude of the voltage on the second supply node,
      to cause the second motor coil to be coupled to the second supply node in response to the second coil generating a second voltage having the same polarity as the voltage on the second supply node and having a magnitude greater than the magnitude of the voltage on the second supply node, and
      to cause the first coil to be uncoupled from the second supply node in response to coupling the second coil to the second supply node.

24. The motor controller of claim 23, further comprising:
   a motor driver including
      a first switch having a control node, a first conduction node coupled to the second supply node, and a second conduction node operable to be coupled to the first coil, and
      a second switch having a control node, a first conduction node coupled to the second supply node, and a second conduction node operable to be coupled to the second coil; and
   wherein the rectifier includes
      a first comparator having first and second input nodes coupled across the first switch and having an output node coupled to the control node of the first switch; and
      a second comparator having first and second input nodes coupled across the second switch and having an output node coupled to the control node of the second switch.

25. The motor controller of claim 23 wherein the rectifier comprises a capacitor coupled between the first and second supply nodes.

26. A disk drive, comprising:
   a disk;
   a spindle motor having spindle coils and operable to rotate the disk;
   a read write head;
   a voice coil motor having a voice coil and operable to move the read write head; and
   a motor controller including
      a supply node operable to receive a first supply voltage during a first period and to be isolated from the supply voltage during a second period,
      a rectifier, operable while the supply node is isolated from the supply voltage,
         to cause a first spindle coil to be coupled to the supply node in response to the first coil generating a first voltage having a same polarity as a voltage on the supply node and having a magnitude greater than a magnitude of the voltage on the supply node,
         to cause a second spindle coil to be coupled to the supply node in response to the second coil generating a second voltage having the same polarity as the voltage on the supply node and having a magnitude greater than the magnitude of the voltage on the supply node, and
         to cause the first coil to be uncoupled from the supply node in response to coupling the second coil to the supply node, and
      a driver circuit coupled to the supply node and operable to cause the voice coil motor to park the read write head while the first supply node is isolated from the supply voltage.

27. A method, comprising:
   closing a first switch having first and second conduction nodes respectively coupled to a first supply node and to a first motor coil in response to a voltage at the second conduction node having a same polarity as a voltage at the first conduction node and having a magnitude greater than a magnitude of the voltage at the first conduction node;
   closing a second switch having first and second conduction nodes respectively coupled to the supply node and to a second motor coil in response to a voltage at the second conduction node of the second switch having a same polarity as a voltage at the first conduction node of the second switch and having a magnitude greater than a magnitude of the voltage at the first conduction node of the second switch; and
   opening the first switch in response to the voltage at the supply node having a same polarity as the voltage at the second conduction node of the first switch and having a magnitude greater than the magnitude of the voltage at the second conduction node of the first switch.

28. The method of claim 27 wherein closing the first switch comprises closing the first switch in response to the voltage at the second conduction node of the first switch having a magnitude at least a set amount greater than the magnitude of the voltage at the first conduction node of the first switch.

29. The method of claim 27 wherein closing the second switch comprises closing the second switch in response to the voltage at the second conduction node of the second switch having a magnitude at least a set amount greater than the magnitude of the voltage at the first conduction node of the second switch.

30. The method of claim 27 wherein opening the first switch comprises opening the first switch in response to the voltage at the supply node having a magnitude at least a set amount greater than the magnitude of the voltage at the second conduction node of the first switch.

31. The method of claim 27, further comprising drawing current from the supply node to park a read write head.

32. The method of claim 27, further comprising:
closing a third switch having first and second conduction nodes respectively coupled to a second supply node and to the first motor coil in response to a voltage at the second conduction node having a same polarity as a voltage at the first conduction node of the third switch and having a magnitude greater than a magnitude of the voltage at the first conduction node of the third switch;
closing a fourth switch having first and second conduction nodes respectively coupled to the second supply node and to the second motor coil in response to a voltage at the second conduction node of the fourth switch having a same polarity as a voltage at the first conduction node of the fourth switch and having a magnitude greater than a magnitude of the voltage at the first conduction node of the fourth switch; and
opening the third switch in response to the voltage at the second supply node having a same polarity as the voltage at the second conduction node of the third switch and having a magnitude greater than the magnitude of the voltage at the second conduction node of the third switch.

33. The method of claim 27, further comprising:
driving a regulated supply voltage onto the first supply node;
closing and opening the first switch independently of the voltage at the second conduction node while driving the supply voltage onto the first supply node; and
closing the second switch independently of the voltage at the second conduction node of the second switch while driving the supply voltage onto the first supply node.

34. The method of claim 27, further comprising:
closing a third switch having first and second conduction nodes respectively coupled to the first supply node and to a third motor coil in response to a voltage at the second conduction node having a same polarity as a voltage at the first conduction node and having a magnitude greater than a magnitude of the voltage at the first conduction node; and
opening the second switch in response to the voltage at the supply node having a same polarity as the voltage at the second conduction node of the second switch and having a magnitude greater than the magnitude of the voltage at the second conduction node of the second switch.

35. A method, comprising:
coupling a first motor coil to a supply node in response to the first coil generating a first voltage having a same polarity as a power down voltage on the supply node and having an absolute value greater than an absolute value of the power down voltage;
coupling a second motor coil to the supply node in response to the second coil generating a second voltage having the same polarity as the power down voltage and having an absolute value greater than the absolute value of the power down voltage, and
uncoupling the first coil from the supply node after coupling the second coil to the supply node.

36. The method of claim 35, further comprising:
coupling a third motor coil to the supply node in response to the third coil generating a third voltage having a same polarity as the power down voltage and having an absolute value greater than the absolute value of the power down voltage; and
uncoupling the second coil from the supply node after coupling the third coil to the supply node.

37. The method of claim 36, further comprising uncoupling the third coil from the supply node after coupling the first coil to the supply node.

* * * * *